United States Patent [19]

Kaneko

[11] Patent Number: 4,881,697

[45] Date of Patent: Nov. 21, 1989

[54] REEL WITH STARTING FORCE SPRING CASTING

[75] Inventor: Kyoichi Kaneko, Tokyo, Japan

[73] Assignee: Daiwa Seiko, Inc., Tokyo, Japan

[21] Appl. No.: 205,475

[22] Filed: Jun. 13, 1988

[30] Foreign Application Priority Data

Jul. 1, 1987 [JP] Japan ................................ 62-165024
Oct. 6, 1987 [JP] Japan ................................ 62-253318

[51] Int. Cl.⁴ ............................................ A01K 89/01
[52] U.S. Cl. .................................................... 242/254
[58] Field of Search ............ 242/84.1 A, 84.3, 84.1 K, 242/84.1 N, 211, 217, 218

[56] References Cited

U.S. PATENT DOCUMENTS

| 2,145,966 | 2/1939 | Bedell | 242/84.1 K |
| 2,290,268 | 7/1942 | Blaser | 242/84.3 |
| 2,613,044 | 10/1952 | Jetts | 242/84.1 N |
| 2,980,361 | 4/1961 | Nachtrieb | 242/84.3 |
| 3,516,191 | 6/1970 | Baenziger | 242/84.1 K |
| 4,775,112 | 10/1988 | Urso | 242/84.1 A |

Primary Examiner—Daniel P. Stodola
Assistant Examiner—Katherine Matecki
Attorney, Agent, or Firm—Kalish & Gilster

[57] ABSTRACT

A spinning reel, which is capable of applying a starting force of the direction of paying out a fishing line to a spool at the time of casting, includes a spool forcibly-rotating unit built in a reel body. This spool forcibly-rotating unit applies a turning torque to the spool in the direction of forcibly paying out the line at the beginning of casting. Accordingly, the inertia for starting the spool when a sinker flies off in response to casting is prevented from acting on the sinker, so that the fishing line can be easily released even with a light sinker, the flying distance of the sinker can be increased, casting can be achieved without difficulty, and a spinning rod can be easily controlled at the time of casting.

3 Claims, 4 Drawing Sheets

REEL WITH STARTING FORCE SPRING CASTING

BACKGROUND OF THE INVENTION

This invention relates to a casting reel and, more particularly, to a type capable of applying a starting force of the direction of paying out a fishing line to a spool at the time of releasing the line (at the time of casting).

Casting reels capable of giving a twist to the line, providing a winding force and an increased amount of winding, and meeting a variety of fishing environments and conditions are classified mainly into a double-bearing type and a single-bearing type, both capable of winding up and paying out the fishing line by rotating the spool. This type of casting reel is known as disclosed in Japanese Utility Model Application Laid-Open No. 59-59875 and the like.

In the type of casting reel in which the fishing line is paid out by the free rotation of the spool, a large inertia of the spool makes its starting torque fairly large when releasing the fishing line (i.e. casting) to throw a jig toward a fishing point; consequently, a resistance force acting on the jig being casted toward the point so as to decrease the throw-in speed of the jig increases; hence, the flying distance of the jig is limited. Particularly, the larger the reel size, the stronger the spool strength must be; as a result, the spool itself becomes large-sized and heavy-weighted, and its inertia becomes further large. Accordingly, with a light-weighted sinker the spool tends not to be started, thereby making casting impossible; otherwise, even if the spool is started, a throw-in force for the sinker will be absorbed substantially entirely by the starting of the spool, so that only a limited flying distance will be expected for the sinker.

On the other hand, in the case of small-sized and medium-sized casting reels, even if it is tried to rotate the spool at high speeds through snap cast operation and the like, no desired motion results, no flying distance is increased, the controllability of a rod is poor, and some backlash appears.

SUMMARY OF THE INVENTION

The present invention has been devised to overcome the foregoing drawbacks.

Therefore, it is an object of the present invention to provide a casting reel which permits smooth casting, increases the flying distance, and facilitates control at the time of casting, without being influenced by the inertia of a spool.

A casting reel according to the present invention is of the type in which a spool is free-rotatably supported by a reel body and can be rotated for winding-up of a fishing line by a rotation operating mechanism built in the reel body, and is characterized by a spool forcibly-rotating unit provided in the reel body for starting the spool in the direction of paying out the line at the beginning of releasing of the line.

According to the present invention, the spool forcibly-rotating unit starts the spool instantly in the direction of paying out the line at the time of casting, so that the inertia required to start the rotation of the spool can be prevented from acting on a sinker flying off in response to casting operation. Therefore, the flying distance of the sinker is enhanced, and the casting operation is facilitated.

DESCRIPTION OF THE PREFERRED EMBODIMENTS

Embodiments of the present invention will now be described with reference to the drawings.

FIGS. 1 through 4 show a first embodiment of a casting reel according to the present invention.

Figure 1:
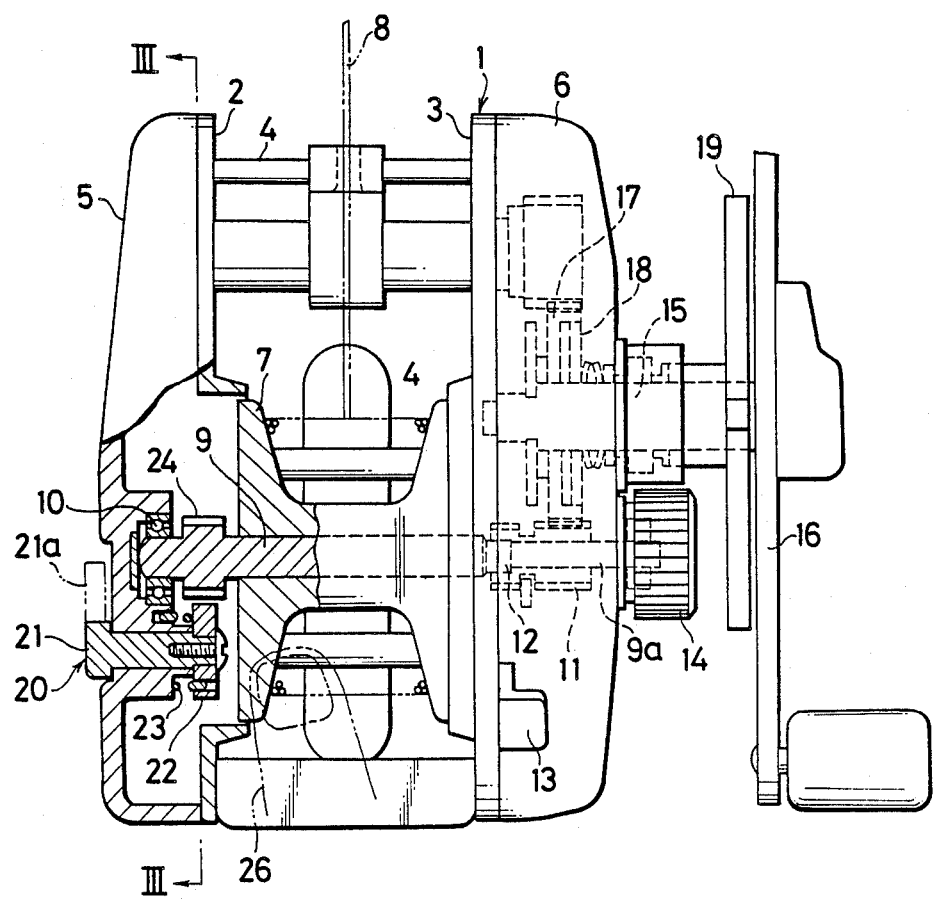
FIG. 1 is a fragmentary plan view showing an embodiment of a double-bearing reel to which a spool forcibly-rotating system according to the present invention is applied.

FIG. 1 is a fragmentary plan view of a casting reel of the double bearing type to which the system of the present invention is applied, in which 1 is a reel frame body, this reel frame body 1 being composed of left and right side frames 2 and 3 facing opposite each other with a certain spacing left therebetween, and a plurality of columns 4 connecting these side frames 2 and 3 together. 5 is a combination cover and left side plate attached to the left side frame 2 of the reel frame body 1, and 6 is a combination cover and right side plate attached to the right side frame 3 of the reel frame body 1. 7 is a spool disposed between the left and right side frames 2 and 3 of the reel frame body 1, around which a fishing line 8 is wound, and through which a spool shaft 9 is passed at the axial center and secured thereto. One end of the spool shaft 9 is rotatably supported by the left side plate 5 via a bearing 10, the other end portion of the spool shaft 9 is rotatably supported by the right side frame 3 via another bearing not shown, a projecting shaft portion 9a of the spool shaft 9 projecting inside the right side plate 6 has a pinion gear 11 mounted thereon relatively rotatably and slidably in the axial direction, one end of the pinion gear 11 is adapted to be detached from a clutch 12 provided on the spool shaft 9, and the engagement and disengagement between the pinion gear 11 and the clutch 12 are effected by an operating lever 13. The point of the projecting shaft portion 9a is connected with a cast control mechanism 14 provided on the right side plate 6.

15 is a driving shaft supported by the right side frame 3, the end of the driving shaft 15 projecting beyond the right side plate 6 has an operating handle 16 secured thereto for spool winding rotation, a portion of the driving shaft 15 located inside the right side plate 6 has a drive gear 17 which is mounted thereon relatively rotatably and adapted to gear with the pinion gear 11, and the drive gear 17 and the driving shaft 15 are in frictional engagement with each other via a drag unit 18. 19 is a knob for adjustment of the drag force of the drag unit 18.

Figure 2:
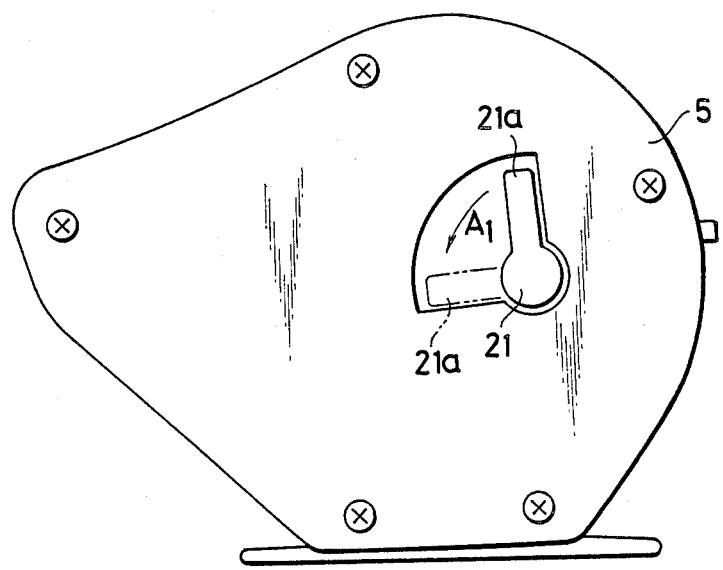
FIG. 2 is a left side view of FIG. 1.
Figure 3:
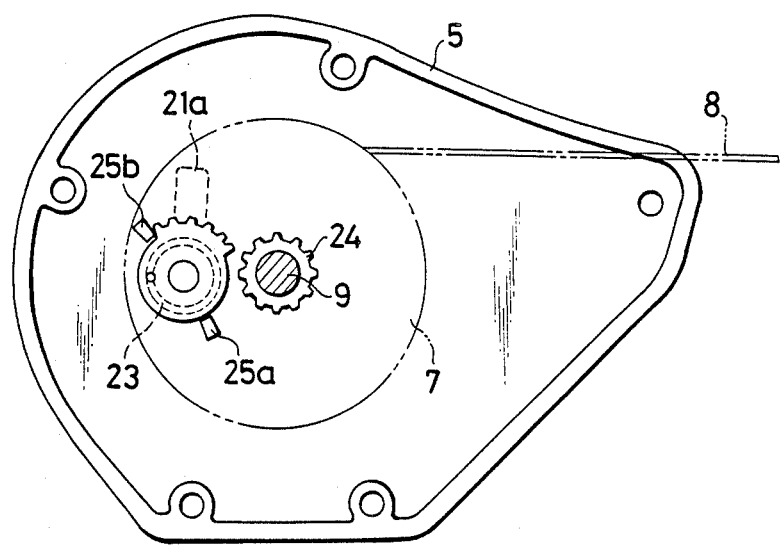
FIG. 3 is a sectional view taken along line III—III in FIG. 1.

In FIG. 1, reference numeral 20 designates a forcibly-rotating unit for forcibly rotating the spool 7 in the direction of paying out the line. This forcibly-rotating unit 20, as shown in FIGS. 1 through 3, is composed of an operating member 21 which passes through the left side plate 5 in parallel to the spool shaft 9 at a position close to the bearing 10 of the spool shaft 9 and is rotatably supported by the left side plate 5, a segment gear 22 (whose circumference is partly free of teeth) secured to the end, projecting inside the left side plate 5, of the operating member 21, a torsion spring 23 disposed around a peripheral portion, between the segment gear 22 and the left side plate, of the operating member 21, with one end coupled to the left side plate 5 and the other end to the segment gear 22, for applying a starting torque of the direction of paying out the line to the spool 7, and a gear 24 formed integrally on the spool shaft 9 and being brought into gear with the segment gear 22. In addition, the end, projecting outside the left side plate 5, of the operating member 21 has a lever 21a formed integrally therewith for rotation operation of the operating member 21. Further, the angle of rotation of the operating member 21 is limited by stoppers 25a and 25b located close to the segment gear 22.

The operation of the thus configured casting reel according to this embodiment will now be described.

In performing casting, first, the clutch operating lever 13 is operated to remove the engagement between the pinion gear 11 and the clutch 12, thereby putting the spool 7 in a free state, and as shown in FIG. 1, a thumb 26 or the like is held against the spool 7.

Figure 4:
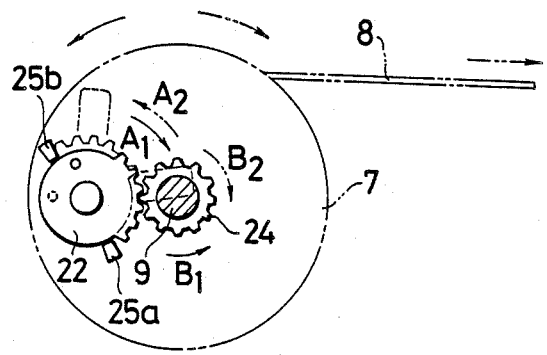
FIG. 4 is a view explanatory of the operation of a spool forcibly-rotating mechanism of the embodiment above.

Next, the lever 21a of the operating member 21 is turned in the direction of the arrow $A_1$ of FIG. 2 (the arrow $A_1$ of FIG. 4) in opposition to the spring force of the torsion spring 23, so that the segment gear 22 kept in a non-geared state as shown in FIG. 3 is brought into gear with the gear 24 of the spool shaft 9 as shown in FIG. 4. In this operation, as the segment gear 22 progressively comes into gear with the gear 24, the spool 7 is rotated in the direction of winding up the line (in the direction of the arrow $B_1$ of FIG. 4), and a rotational energy of the reverse direction is stored in the torsion spring 23. When one end of the segment gear 22 abuts on the stopper 25a, the turn stroke of the operating member 21 is completed. At this moment, the thumb 26 is used to brake the spool 7 so that the spool 7 is prevented from rotating in the direction of paying out the line due to the spring force of the torsion spring 23.

In the thus attained state, when performing casting actually, a casting rod (not shown) equipped with the foregoing reel is thrown from rear to front of a fisherman, and at the same time or at a timing a little earlier than that, the thumb 26 kept in thumbing is detached from the spool 7. As a result, the segment gear 22 is quickly rotated in the direction of the arrow $A_2$ of FIG. 4 due to the return spring force of the torsion spring 23, and concurrently this rotation is transmitted to the spool 7 via the gear 24 kept in gear with the above and the spool shaft 9, so that the spool 7 is forcibly rotated in the direction of the arrow $B_2$ of FIG. 4, i.e. in the direction of paying out the line. Accordingly, the inertia effective at the beginning of spool rotation with respect to the flying of the sinker is borne by the forcible rotational force caused by the torsion spring 23, so that the flying force of the sinker can be reduced little.

After casting, the segment gear 22 returns to the position shown in FIG. 3 and to the non-geared state with the gear 24, so that the spool 7 can rotate freely until the sinker lands on the water, or at the point.

Therefore, the fishing line can be easily released, the flying distance can be elongated, casting can be achieved without forcing the fisherman to perform unnatural rod operation, thereby being easily controlled, and the jig can be accurately thrown to the point; these features could not be achieved in the prior art with the flying force of a light-weighted sinker. Further, a fear that the fishing line will be cut off due to an impulsive tensile force acting thereon disappears; thus, the present invention is very suited for spools with large inertia, such as large-sized reels.

Figure 5:
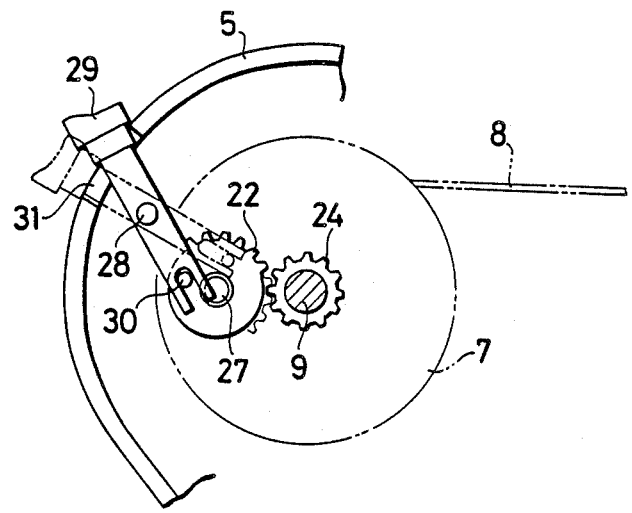
FIG. 5 is a sectional view of an important portion showing a second embodiment of a spool forcibly-rotating unit according to the present invention.

FIG. 5 shows a second embodiment of the spool forcibly-rotating unit according to the present invention.

In this embodiment, the segment gear 22 which is brought into gear with the gear 24 of the spool shaft 9 is rotatably supported by the left side plate 5 via a shaft 27, the torsion spring (not shown) is provided similarly to the first embodiment, the operating member for causing the segment gear 22 to store the spool starting torque is made of a lever 29 whose intermediate portion is rotatably attached to the left side plate 5 via a shaft pin 28, one end of the lever 29 is engaged with a pin 30 provided on the segment gear 22, and the other end of the lever 29 projects outward through an opening 31 formed in a peripheral portion of the left side plate 5.

In the thus configured spool forcibly-rotating unit 20, turn the lever 29 from the solid line position to the two-dot chain line position. As a result, the segment gear 22 is rotated in the direction of the arrow similarly to the case of FIG. 4, so that a starting torque of the direction of paying out the line is stored in the built-in torsion spring. Then, if the thumb kept in thumbing is detached from the spool 7, the turning force of the segment gear 22 is transmitted to the spool 7 via the gear 24 and the spool shaft 9, so that the spool 7 is quickly rotated forcibly in the direction of paying out the line.

Therefore, this embodiment provides effects identical with those described above.

Figure 6:
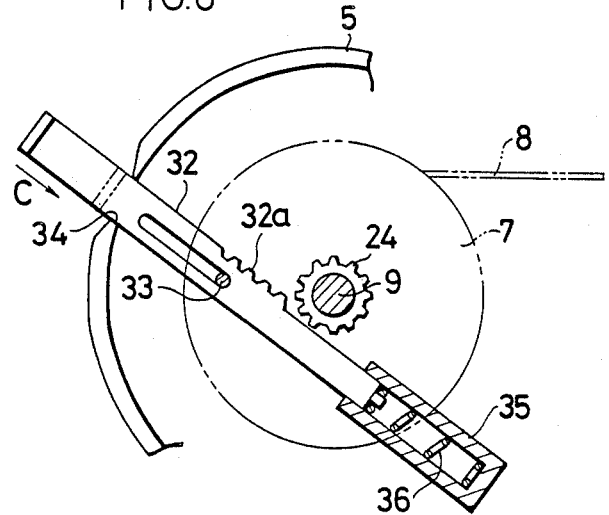
FIG. 6 is a sectional view of an important portion showing a third embodiment of the spool forcibly-rotating unit according to the present invention.

FIG. 6 shows a third embodiment of the spool forcibly-rotating unit 20 according to the present invention.

The arrangement of FIG. 6 utilizes a rack and pinion system, that is, a rack 32 constituting the operating member is supported slidably in the direction tangential to the gear 24 of the spool shaft 9 by means of a pin 33 provided inside the left side plate 5, one end of the rack 32 projects outward through an opening 34 formed in a peripheral portion of the left side plate 5, the other end of the rack is fitting in a guide member 35 provided inside the left side plate 5, and a compression spring 36 for urging the rack 32 so as to project outward is provided inside the guide member 35.

In the thus configured spool forcibly-rotating unit 20, if the rack 32 is slid in the direction of the arrow C in opposition to the spring 36, its tooth portion 32a comes into gear with the gear 24; as a result, the gear 24 and the spool 7 integral therewith are rotated in the direction of winding up the line and the spring 36 is compressed, so that a rotational energy which acts to quickly rotate the spool 7 when it is to be started to rotate in the direction of paying out the line is stored.

In the thus attained state, when performing casting, if the thumb kept in thumbing is detached from the spool 7, the rack 32 is quickly moved in the direction opposite to the arrow C by the expansion force of the spring 36 under compression, so that this quick straight motion is converted into a quick rotational motion by the tooth portion 32a and the gear 24 held in gear therewith, this quick rotation is transmitted to the spool 7, whereby the spool 7 is forcibly rotated in the direction of paying out the line; hence, the inertia of the spool 7 is prevented from being imposed on the flying sinker.

Therefore, this embodiment provides effects identical with those of the first embodiment.

Figure 7:
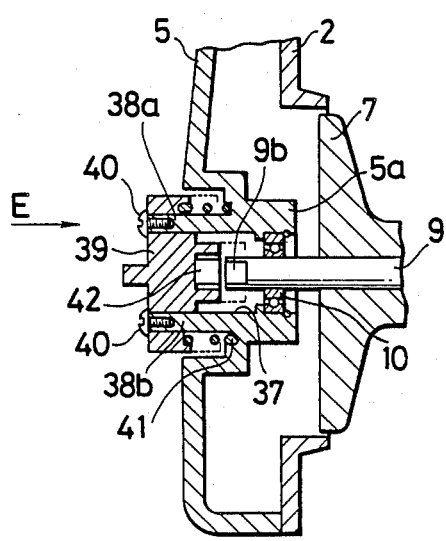
FIG. 7 is a sectional view of an important portion showing a fourth embodiment of the spool forcibly-rotating unit according to the present invention.
Figure 8:
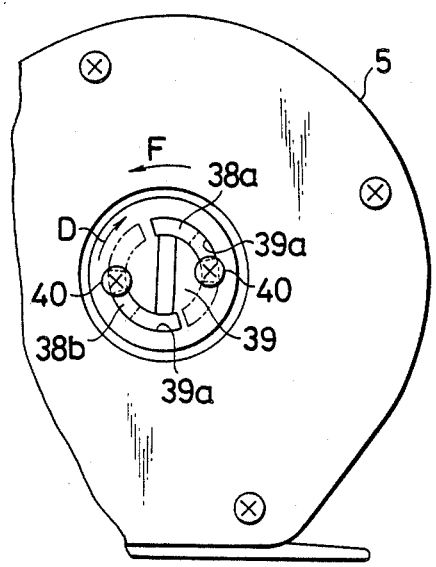
FIG. 8 is a left side view of the above.

FIGS. 7 and 8 show a fourth embodiment of the spool forcibly-rotating unit 20 according to the present invention.

In this embodiment, a bearing portion 5a for supporting one end of the spool shaft 9 via the bearing 10 has a cylindrical hole 37 which is opened outward through the left side plate 5 and the axial line of which is coincident with that of these members, support pieces 38a and 38b of a pair which are outwardly projecting portions of the left side plate 5 are provided around the end margin of the cylindrical hole 37 symmetrically about the axial line of the cylindrical hole 37, engaged with this pair of support pieces 38a and 38b is a disc-shaped operating member 39 which is slidable in the axial direction of the cylindrical hole 37 and rotatable about the axial line thereof, this operating member 39 is prevented from coming off by screws 40 screwed to the points of the support pieces 38a and 38b, and a torsion spring 41 is provided around peripheral portions, located inside the operating member 39, of the support pieces 38a and 38b, the ends of this torsion spring being secured to the operating member 39 and the left side plate 5.

Further, the operating member 39 has an engage hole 42 formed in the inside end face thereof which is engageable with an angular end portion 9b of the spool shaft 9.

Incidentally, the angle of rotation of the operating member 39 is limited by guide holes 39a through which the support pieces 38a and 38b pass.

In the thus configured spool forcibly-rotating unit, when applying a forcible turning torque of the direction of quickly paying out the line to the spool 7 for casting operation, rotate the operating member 39 in the direction of the arrow D of FIG. 8 up to the full angle of the guide holes 39a, and then push the operating member 39 in the direction of the arrow E of FIG. 7; as a result, the engage hole 42 is engaged with the end portion 9b of the spool shaft 9.

In the thus attained state, if the thumb kept in thumbing is detached from the spool 7, the operating member 39 is quickly rotated in the direction of the arrow F of FIG. 8 by the return action of the torsion spring 41, and concurrently this quick turning torque is transmitted to the spool 7 via the spool shaft 9, whereby the spool 7 is quickly rotated in the direction of paying out the line. As a result, the inertia of the spool 7 disappears, so that the sinker can fly without difficulty.

Therefore, this embodiment provides effects identical with those of the first embodiment.

Figure 9:
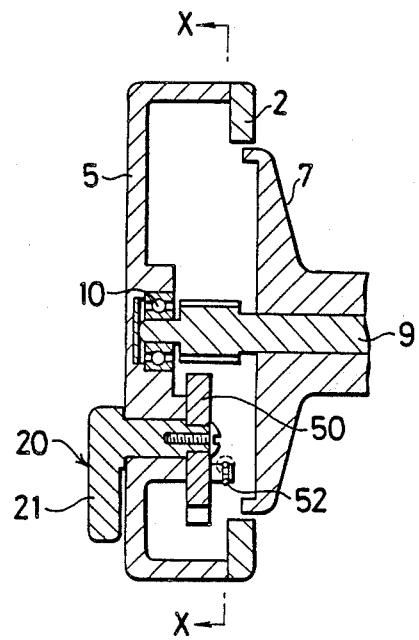
FIG. 9 is a sectional view of an important portion showing a fifth embodiment of the spool forcibly-rotating unit according to the present invention.
Figure 10:
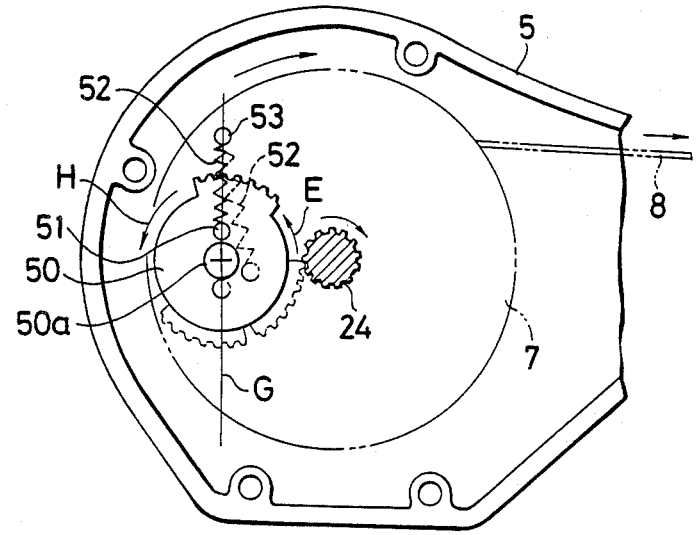
FIG. 10 is a sectional view taken along line X—X in FIG. 9.

FIGS. 9 and 10 show a fifth embodiment of the spool forcibly-rotating unit 20 according to the present invention.

In this embodiment, a segment gear 50 and a spring 52 are used instead of the segment gear 22 and the torsion spring 23 of the first embodiment. Specifically, the segment gear 50 is disposed in the location of the segment gear 22, a spring lock pin 51 is provided on the segment gear 50, one end of the spring 52 is locked to the spring lock pin 51, and the other end of the spring 52 is locked to another spring lock pin 53 provided on the inner wall of the left side plate 5, so that the segment gear 50 is urged either in the forward direction or in the reverse direction depending on which side the spring is located if a line G connecting the two spring lock pins 51 and 53 and a shaft support portion 50a of the segment gear 50 together is taken as a border, and the segment gear 50 is brought into gear with the gear 24 of the spool shaft 9, thereby forcibly rotating the shaft in the direction of paying out the line.

In the thus configured spool forcibly-rotating unit, similarly to the first embodiment, when performing casting, first, the clutch 13 is operated to remove the engagement between the pinion gear 11 and the clutch 12, thereby putting the spool 7 in the free state, and the thumb 26 or the like is held against the spool 7.

Next, the operating member 21 is turned in the direction of the arrow H of FIG. 10; as a result, the segment gear 50 passes over its dead point and stops at the geared position with the gear 24 of the spool shaft 9, as shown by the dotted line. At this moment, the segment gear 50 is urged by the spring 52 so as to forcibly rotate the gear 24 of the spool shaft 9 in the direction of paying out the line.

In the thus attained state, if the thumb 26 is detached from the spool 7 or a line-wound surface of the spool 7 concurrently with casting, the segment gear 50 is quickly rotated in the direction of the arrow E by the return spring force of the spring 52, and concurrently this rotation is transmitted to the spool 7 via the gear 24 in gear with the above and the spool shaft 9, so that the spool 7 is forcibly rotated in the direction of paying out the line. Accordingly, the inertia effective at the beginning of spool rotation with respect to the flying of the sinker is borne by the forcible rotational force caused by the spring 52, so that the flying force of the sinker can be reduced little.

After casting, the segment gear 50 returns to its initial position as shown by the solid line in FIG. 10 and to the non-geared state with the gear 24, so that the spool 7 can rotate freely until the sinker lands on the water, or at the point.

In this way, the spool 7 can be forcibly rotated, similarly to the foregoing embodiments, by rotating the operating member 21 in one direction.

As will be appreciated, the spool forcibly-rotating unit 20 according to the present invention should not be limited only to the embodiments in which the unit is provided on the non-drive side, it may be provided on the drive side including the handle 16. Further, the present invention, of course, can be applied not only to the double-bearing reel, but also to the single-bearing reel.

As described above, according to the present invention, the spool forcibly-rotating unit is built in the reel body, and this unit is adapted to apply the turning torque of the direction of forcibly paying out the line to the spool when starting casting, so that the inertia effective in spool starting when the sinker flies off in response to casting is prevented from acting on the sinker; accordingly, the fishing line can be easily released even with a light-weighted sinker, the flying distance can be elongated, casting can be performed without difficulty, and the rod can be easily controlled at the time of casting.

What is claimed is:

1. A casting reel including a spool which is free-rotatably supported by a reel body and can be rotated for winding-up of a fishing line by a rotation operating mechanism built in the reel body,
    characterized by a spool forcibly rotating unit composed of an operating member rotatably attached to the reel body, a spring member for applying a spool starting torque to the operating member, a first gear provided on the spool, and a segment gear secured to an end of said operating member, wherein said segment gear intermittently engages said first gear to transmit the spool starting torque of the operating member to the spool, said spool forcibly rotating unit being provided in the reel body for rotating the spool in the direction of paying out the line at the beginning of releasing the line.

2. A casting reel including a spool which is free-rotatably supported by a reel body and can be rotated for winding-up of a fishing line by a rotation operating mechanism built in the reel body,
    characterized by a spool forcibly-rotating unit composed of an operating member rotatably attached to the reel body, a segment gear attached to the reel body so that its rotation can be controlled by the operating member and including a spool-starting-torque applying spring built therein, and a gear provided on the spool said gear on the spool intermittently engaging the segment gear to transmit the starting torque to the spool, said spool forcibly rotating unit being provided in the reel body for rotating the spool in the direction of paying out the line at the beginning of releasing the line.

3. A casting reel including a spool which is free-rotatably supported by a reel body and can be rotated for winding-up of a fishing line by a rotation operating mechanism built in the reel body,
    characterized by a spool forcibly-rotating unit composed of an operating member rotatably attached to the reel body, a spring for applying a spool starting torque to the operating member, a first gear provided on the spool, and a segment gear secured to an end of said operating member, wherein said segment gear intermittently engages said first gear to transmit the spool starting torque of the operating member to the spool, the spring member being connected at a first end with the reel body and at a second end with the segment gear such that the segment gear is urged either in a forward direction or in a reverse direction depending on which side the spring member is located if a line connecting the first end of the spring member and a shaft support portion of the segment gear together is taken as a border, said spool forcibly-rotating unit being provided in the reel body for rotating the spool in the direction of paying out the line at the beginning of releasing the line.

* * * * *

UNITED STATES PATENT AND TRADEMARK OFFICE
CERTIFICATE OF CORRECTION

PATENT NO. : 4,881,697

DATED : Nov. 21, 1989

INVENTOR(S) : K. Kaneko

It is certified that error appears in the above-identified patent and that said Letters Patent is hereby corrected as shown below:

IN THE TITLE:

Please delete the present title and insert the following:

--CASTING REEL WITH STARTING FORCE SPRING--

Signed and Sealed this

Twenty-third Day of October, 1990

Attest:

HARRY F. MANBECK, JR.

*Attesting Officer*     *Commissioner of Patents and Trademarks*